United States Patent
Young et al.

[11] Patent Number: 5,941,584
[45] Date of Patent: Aug. 24, 1999

[54] ROAST LIFTING TOOL

[75] Inventors: Mark J. Young, 32 Cottage Cir., West Lebanon, N.H. 03784; Lars T. Jonasson, Plymouth, Mass.; James L. Bryce, Fairfax, Vt.

[73] Assignee: Mark J. Young, West Lebanon, N.H.

[21] Appl. No.: 08/991,067

[22] Filed: Dec. 15, 1997

[51] Int. Cl.⁶ .............................. B65G 7/12; A47J 43/18
[52] U.S. Cl. .......................... 294/15; 294/55.5; 294/58; 294/61
[58] Field of Search ................... 294/9, 15, 16, 294/26, 55.5, 58, 61; 99/421 A, 426, 450; 30/322; D7/688, 690

[56] References Cited

U.S. PATENT DOCUMENTS

| | | | |
|---|---|---|---|
| D. 24,534 | 8/1895 | Hirsh | 30/322 |
| D. 218,189 | 7/1970 | Demetreon | D44/4 |
| D. 227,029 | 5/1973 | Demetreon | D44/4 |
| D. 262,859 | 2/1982 | Russell | D7/151 |
| 269,557 | 8/1882 | Banvoetz | 294/55.5 |
| D. 282,898 | 3/1986 | Furlan | D7/102 |
| D. 282,899 | 3/1986 | Furlan | D7/102 |
| D. 319,949 | 9/1991 | Pollack | D7/683 |
| 517,461 | 4/1894 | Laffer | 294/55.5 |
| 850,582 | 4/1907 | Horton | 294/15 |
| 1,086,636 | 2/1914 | Anderson | 294/26 |
| 1,227,920 | 5/1917 | Maaske | 294/27.1 |
| 1,515,975 | 11/1924 | Smith | 294/26 |
| 1,604,050 | 10/1926 | Jennings . | |
| 2,450,716 | 10/1948 | Chittick | 99/426 |
| 2,514,098 | 7/1950 | Shreiner | 294/1 |
| 2,575,794 | 11/1951 | Chauncey | 294/55.5 |
| 2,593,077 | 4/1952 | Vogt | 248/165 |
| 2,944,851 | 7/1960 | Dulmage | 294/61 |
| 2,973,218 | 2/1961 | Schaum | 294/1 |
| 3,359,889 | 12/1967 | Young et al. | 99/426 |
| 3,447,827 | 6/1969 | Meszaros | 294/16 |
| 3,613,552 | 10/1971 | Kean | 99/426 |
| 4,200,040 | 4/1980 | MacRae | 99/426 |
| 4,354,702 | 10/1982 | Clements et al. | 294/15 |

OTHER PUBLICATIONS 4 xerographic reproductions of lifting tools, no date.

*Primary Examiner*—Dean Kramer
*Attorney, Agent, or Firm*—Jeffrey E. Semprebon; Michael J. Weins

[57] ABSTRACT

A lifting tool for roasted meat, having a main handle with a longitudinal handle axis, a first handle end and a second handle end. A pair of tines are spaced apart, each having a tine base end and a tine tip end and being formed with a substantially continuous curve which is concave when viewed from the second handle end. A pair of cross members connect the first handle end to the tine base ends. Preferably, an auxiliary handle is provided, having a gripping region and being affixed such that the curve of the tines is concave when viewed from the gripping region. The auxiliary handle preferably has an auxiliary handle base section which extends upwards from the cross members and an auxiliary handle set-back section which connects the auxiliary handle base section to the gripping region and which extends towards the second handle end. The lifting tool preferably has a stabilizing prong having a longitudinal prong axis which is parallel to the handle axis, and a prong tip which is pointed. It is also preferred for each of the tine tip ends to be contoured with a sloped surface and rounded.

17 Claims, 5 Drawing Sheets

ROAST LIFTING TOOL

FIELD OF THE INVENTION

The present invention is a lifting tool for lifting and supporting roasted meat such as a turkey or other poultry, roast beef, etc., one embodiment of the present invention being described in Disclosure Document No. 409,511, filed Dec. 13, 1996.

BACKGROUND OF THE INVENTION

Meat roasts are typically cooked in a roasting pan in an oven. To serve the roast after cooking, the roast is generally removed from the roasting pan and transferred to a serving platter or similar dish to facilitate carving and to afford an attractive presentation of the roast. However, roasts are frequently heavy and difficult to handle. Immediately after removal from the oven, the roast is uncomfortably hot to handle, and is frequently slippery. Thus, it is desirable to use a tool to assist in lifting the roast from the roasting pan in order to avoid burning the hands or accidentally dropping the roast.

Traditionally, large forks have been employed to spear the roast for transferring it. U.S. Pat. Nos. Des. 282,898 and Des. 282,899 disclose two designs for such forks, which have short, sharp tines for spearing the roast. Such forks frequently result in damage to the roast, and are reliant on sufficient structural integrity of the roast in order to work. In the case of a heavy roast which is tender, such forks may be unable to pick up the roast, as the roast will not have sufficient structural integrity to support its weight. This situation is particularly true of large roasted poultry such as a roasted turkey or goose. Typically, a pair of forks is required, one at each end, in order to maneuver the roast properly.

U.S. Pat. No. Des. 262,859 teaches a food fork having multiple tines. The '859 patent does not teach how the fork is used; however, the multiple tines do not appear to be configured to provide support for the roast, other than by impaling the roast thereupon. The multiple tines increase the chance of damaging the roast when it is so impaled.

U.S. Pat. No. Des. 319,949 discloses an alternative design for a roast lifting tool which is S-shaped with a pointed support member. This tool is apparently intended for either spearing a roast or, in the case of roasted poultry having an internal cavity, for insertion into the internal cavity for lifting the roasted poultry. Such a device is necessarily dependent on the roast having sufficient structural integrity. Additionally, because the tool has only a single support member, the roast will be free to rotate about the axis of this support member, limiting the user's ability to maneuver the roast.

In attempting to overcome the recognized deficiencies of traditional forks and similar implements, other roast lifters have employed a rack or frame for supporting the roast, particularly for use with roasted poultry. Representative devices are taught in U.S. Pat. Nos. 2,514,098; 2,593,077; 2,973,218; 3,359,889; 3,613,552; and 4,200,040. While such devices do not rely on the structural integrity of the roast and reduce the chances of damaging the roast, these devices are frequently unsightly and do not provide for ready removal of the device once the roast has been transferred to a serving platter, therefor interfering with an attractive presentation of the roast. Additionally, these devices are intended to remain in contact with the roast as it is cooked. This results in the device becoming hot as the roast is cooked, and therefor difficult to handle safely upon removal from the oven. The device of the '552 patent attempts to solve this problem by employing detachable handles, but this creates the new problem of attempting to attach the handles in the narrow confines of an oven without burning the hands.

Thus, there is a need for a tool which will provide adequate support for lifting and maneuvering a roast, which is not reliant on the structural integrity of the roast, and which is readily insertable and removable from engagement with the roast.

SUMMARY OF THE INVENTION

The present invention provides a lifting tool for lifting and supporting a roasted meat item, such as roasted poultry, beef roasts, and the like, hereafter simply referred to as a roast unless otherwise specified. The lifting tool has a main handle which serves as a grip for the user of the lifting tool. The main handle has a longitudinal handle axis, and has a first handle end and a second handle end.

The lifting tool also has a pair of tines. The tines are in a spaced apart relationship, and are preferably substantially parallel to each other. Each of the tines has a tine base end and a tine tip end. Each of the tines is formed with a substantially continuous curve. The curve of the tines is such that it is concave when viewed from the second handle end of the main handle. The substantially continuous curve of the tines enables the tines to be readily slid into position underneath a roast in a roasting pan, and allows the tines to form a cradle to support the roast when it is lifted.

A pair of cross members are provided. Each of the cross members connects the first handle end of the main handle to the tine base end of one of the pair of tines.

To use the lifting tool to lift a roast to transfer it from a roasting pan to a serving platter, the user grasps the main handle of the lifting tool with the tines positioned to curve upwards. The lifting tool is then held with a downwards inclination and the tine tip ends are inserted between the roast and the roasting pan. The user then pushes forward on the main handle, and the substantially continuous curve of the tines guides them under the roast. The roast may then be lifted from the roasting pan, supported on the tines. The substantially continuous curve of the tines forms a cradle for the roast to stabilize it while it is lifted. The roast is then maneuvered to and lowered onto the serving platter. The user then pulls back on the main handle, sliding the tines out from under the roast.

To facilitate lifting heavy roasts, it is preferred for an auxiliary handle to be provided. The auxiliary handle has a gripping region for grasping by a hand of the user. The auxiliary handle is affixed with respect to the cross members such that the substantially continuous curve of the tines is concave when viewed from the gripping region. Preferably, the gripping region of the auxiliary handle extends substantially normal to the handle axis of the main handle. The auxiliary handle allows for grasping the lifting tool with both hands of the user to assist in lifting the roast by grasping the main handle with one hand and grasping the gripping region of the auxiliary handle with the other hand.

It is further preferred for the auxiliary handle to have an auxiliary handle base section which is affixed with respect to the cross members and extends upwards therefrom, and an auxiliary handle set-back section which connects between the auxiliary handle base section and the gripping region. The auxiliary handle set-back section extends towards the second handle end of the main handle, thus offsetting the gripping region with respect to the auxiliary handle base section so as to position the gripping region of the auxiliary handle over the main handle of the roast lifter. Such a configuration of the auxiliary handle helps prevent the hand of the user from coming into contact with the roast. If the roast slips towards the hand of the user, it will be stopped by engagement with the auxiliary handle base section before contacting the hand of the user on the gripping region.

To improve the stability of the roast when it is carried by the lifting tool, it is further preferred to provide at least one stabilizing prong. The stabilizing prong has a longitudinal prong axis which is substantially parallel to the handle axis, and a prong tip which is pointed. The stabilizing prong is affixed with respect to the auxiliary handle so as to extend away from the second handle end. When the roast is slid on the tines until it engages the stabilizing prong, it is impaled thereon, and the stabilizing prong prevents the roast from sliding in a direction substantially normal to the handle axis.

For particular use in lifting and supporting roasted turkeys, geese, and other poultry having a central cavity, it is preferred for both a first stabilizing prong and a second stabilizing prong to be provided. The second stabilizing prong is also affixed with respect to the auxiliary handle and extends substantially parallel to the first stabilizing prong, being in a spaced apart relationship thereto.

In all cases, to aid in sliding the tines underneath a roast in a roasting pan, it is preferred for each of the tines to be contoured with a sloped surface to provide a wedge-shape to the tine tip end. The sloped surface is preferably contoured to slope between a lower side of the tine and the tine tip end. The sloped surface enables each of the tine tips to be wedged in underneath a roast to allow sliding the tines underneath. It is also preferred for the tine tip ends to be rounded to reduce the chances of piercing the roast.

BEST MODE OF CARRYING THE INVENTION INTO PRACTICE

Figure 1:
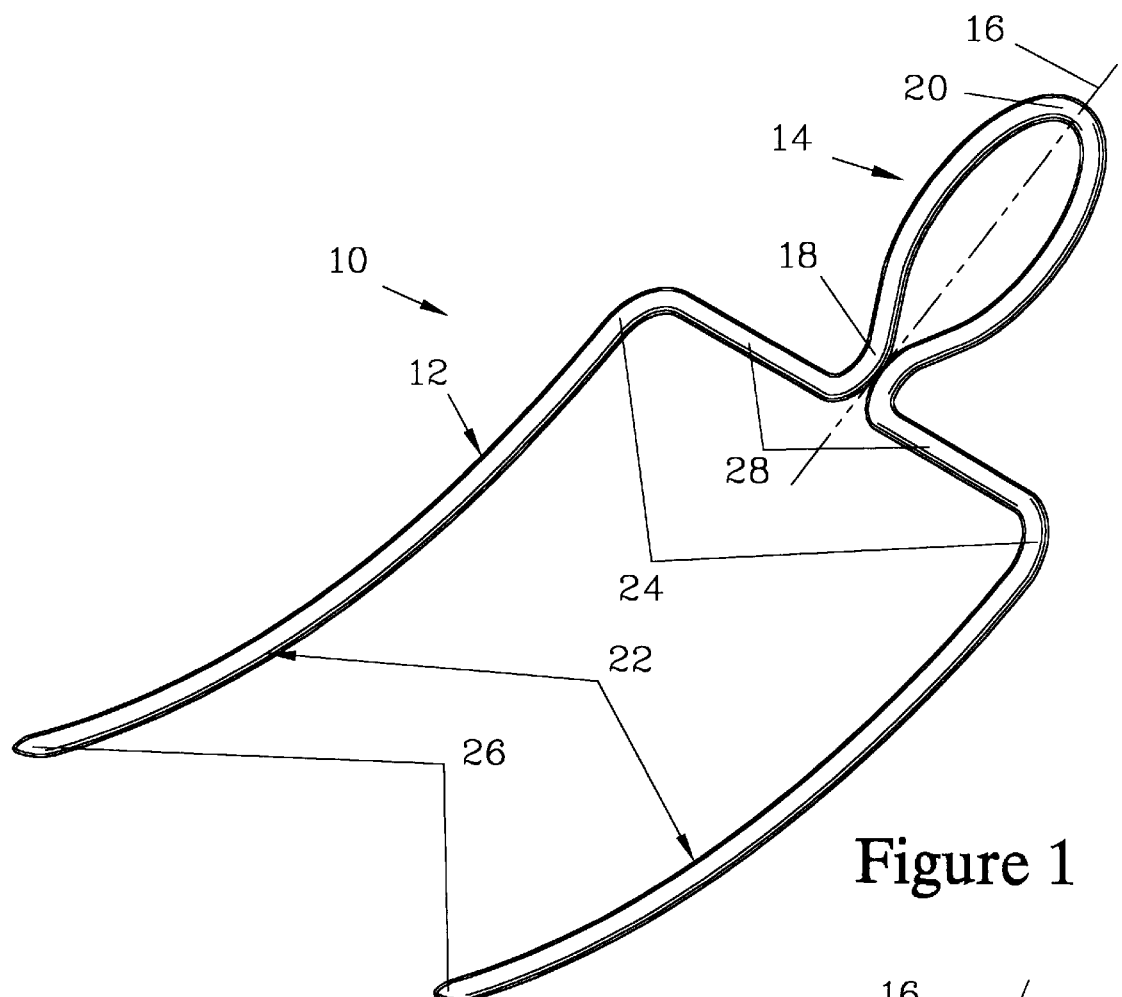
FIG. 1 is an isometric view of one embodiment of a lifting tool of the present invention. The lifting tool illustrated is constructed from a single length of metal rod, which is bent to provide a main handle, a pair of tines, and a pair of cross members which connect the tines to the main handle.

FIG. 1 is an isometric view of one embodiment of the present invention, a lifting tool 10. The lifting tool 10 is formed entirely from a single length of metal rod 12. Preferably, the metal rod 12 is stainless steel to facilitate cleaning of the lifting tool 10 after use.

The lifting tool 10 has a main handle 14 which is formed from a U-shaped loop in the metal rod 12, with the ends of the U bent together and preferably connected by welding or brazing. The main handle 14 serves as a grip for the user of the lifting tool 10, and has a longitudinal handle axis 16. The main handle 14 has a first handle end 18 and a second handle end 20.

The ends of the metal rod 12 are formed into a pair of tines 22 which are in a spaced apart relationship to each other. Each of the tines 22 has a tine base end 24 and a tine tip end 26. Each of the tines 22 is formed with a substantially continuous curve which is concave when viewed from the second handle end 20.

A pair of cross members 28 are also provided. Each of the cross members 28 connects the first handle end 18 with the tine base end 24 of one of the tines 22.

Figure 2:
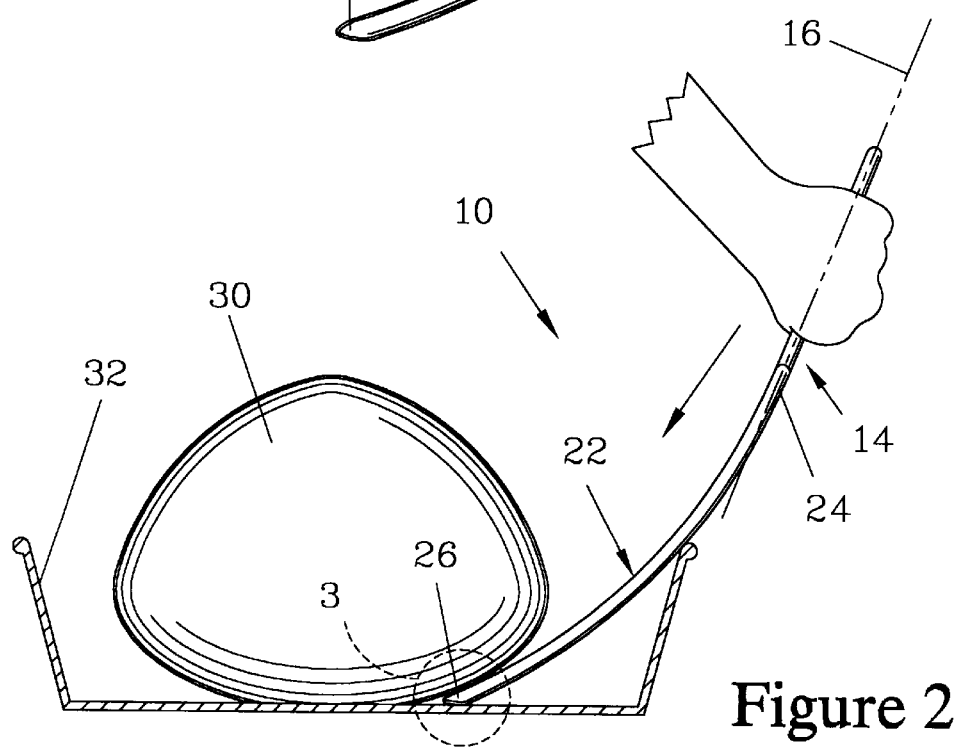
FIG. 2 is a side view of the embodiment shown in FIG. 1, showing the curvature of the tines relative to the main handle, and showing the lifting tool where tine tip ends of the tines are inserted under a roast in a roasting pan.
Figure 4:
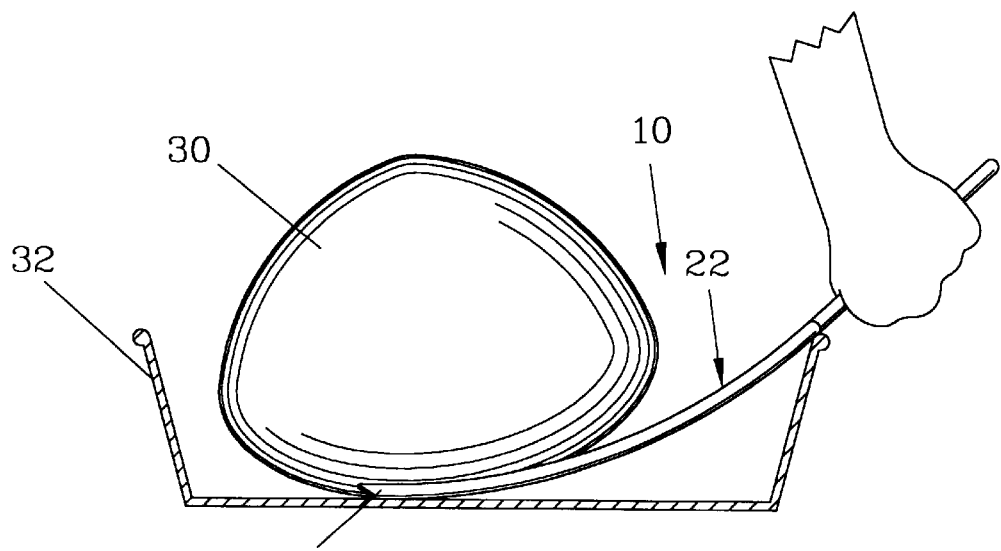
FIG. 4 illustrates the embodiment shown in FIGS. 1 through 3 where the tines have been inserted under the roast prior to removal from the roasting pan.
Figure 5:
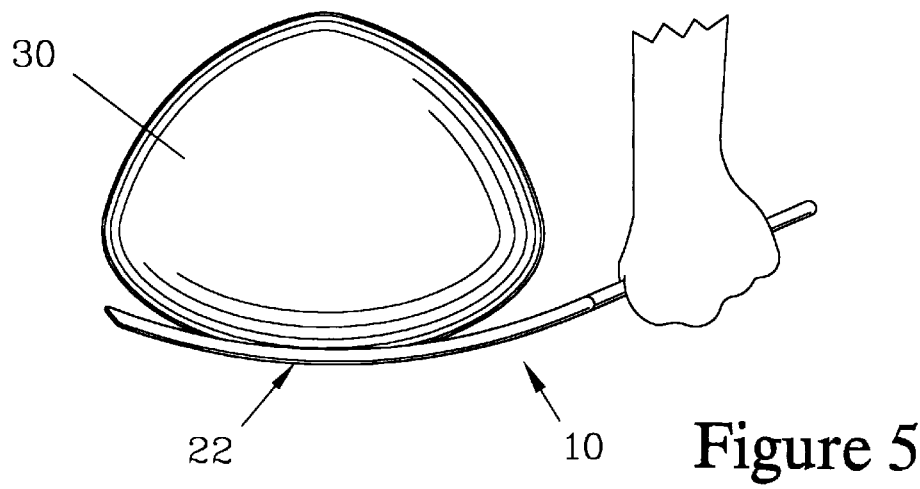
FIG. 5 illustrates the embodiment shown in FIGS. 3 and 4 where the tines are supporting the roast.

FIGS. 2, 4, and 5 illustrate the use of the lifting tool 10 in removing a roast 30 from a roasting pan 32. Preferably, the curvature of the tines 22 is such that, at their tine base ends 24, the tines 22 are tangent to a plane in which the handle axis 16 resides. Such a configuration positions the main handle 14 relative to the tines 22 at a comfortable angle for the user of the lifting tool 10 to slide the tines 22 under and lift the roast 30.

As shown in FIG. 2, to position the lifting tool 10, the user grasps the main handle 14 of the lifting tool 10 with the tines 22 positioned to curve upwards. The lifting tool 10 is then held with a downwards inclination and positioned such that the tine tip ends 26 are inserted between the roast 30 and the roasting pan 32.

Figure 3:
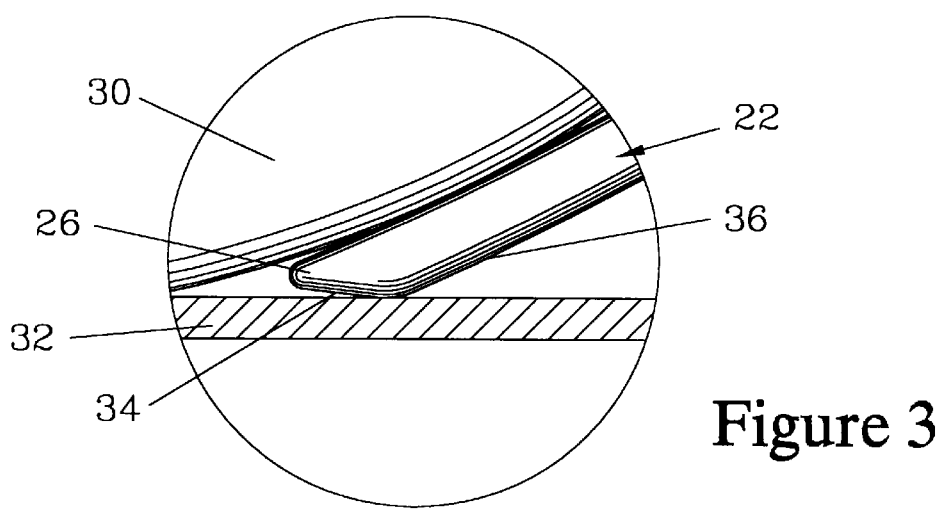
FIG. 3 is a detail view of the region 2b of FIG. 2, showing the tine tip end of one of the tines. The tine is configured with a sloped surface to give the tine tip end a wedge-shaped profile to facilitate insertion under the roast.

To aid in sliding the tines 22 between the roast 30 and the roasting pan 32, each of the tines 22 is preferably contoured with a sloped surface 34, as is shown in the detail view of FIG. 3. The sloped surface 34 extends from a lower surface 36 of the tine 22 to the tine tip end 26, and provides the tine tip end 26 with a wedge-shaped profile. The sloped surface 34 enables the tine tip end 26 to be inserted underneath the roast 30, to facilitate sliding the tine 22 thereunder. Preferably, the tine tip ends 26 are rounded to reduce the chances of accidentally piercing the roast 30.

Once the lifting tool 10 has been positioned with the tine tip ends 26 inserted under the roast 30, the user pushes forward on the main handle 14, as indicated by the arrow in FIG. 2. The curve of the tines 22 guides them under the roast 30, to the position shown in FIG. 4. The roast 30 may then be lifted from the roasting pan 32, supported on the tines 22, as shown in FIG. 5. The curvature of the tines 22 forms a cradle for the roast 30 to stabilize it while it is lifted. The roast 30 may then be moved to a serving tray (not shown), lowered thereon, and the lifting tool 10 removed by reversing the operations illustrated in FIGS. 2 and 4.

Figure 6:
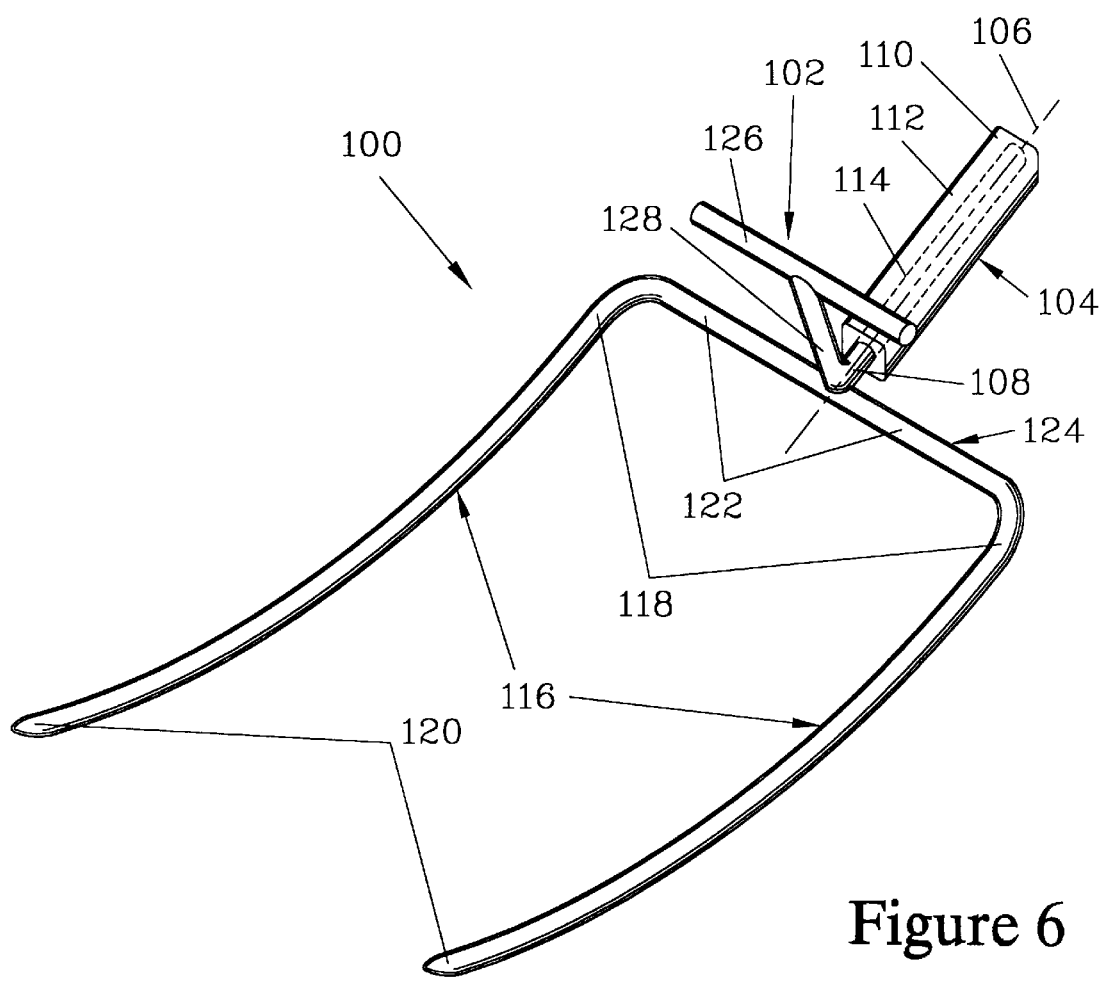
FIG. 6 is an isometric view of another embodiment of the present invention which includes an auxiliary handle to facilitate lifting a heavy roast.

FIG. 6 is an isometric view of a lifting tool 100 which forms another embodiment of the present invention. The lifting tool 100 has an auxiliary handle 102, which allows lifting a roast with reduced strain on the wrists and hands of the user.

The lifting tool 100 has a main handle 104, having a handle axis 106, a first handle end 108, and a second handle end 110. In the lifting tool 100, the main handle 104 has a main handle grip 112, which is preferably an insulating material such as wood or plastic. A tang 114 is embedded in the main handle grip 112, and extends substantially parallel to the handle axis 106.

A pair of tines 116 are provided, each having a tine base end 118 and a tine tip end 120. A pair of cross members 122 are provided, each of which connects the first handle end 108 to one of the tine base ends 118. In this embodiment, the pair of cross members 122 are provided by an integral cross bar 124, which is joined with the tang 114 at the first handle end 108.

The auxiliary handle 102 of the lifting tool 100 has a gripping region 126, which is affixed with respect to the cross members 122 by an upright 128. The gripping region 126 is configured to be grasped by the hand of the user, and is positioned such that the substantially continuous curve of the tines 116 is concave when viewed from the gripping region 126. The gripping region 126 is substantially normal to the handle axis 106 of the main handle 104. Although not shown, the gripping region could be provided with an auxiliary handle grip of an insulating material such as wood or plastic.

Figure 7:
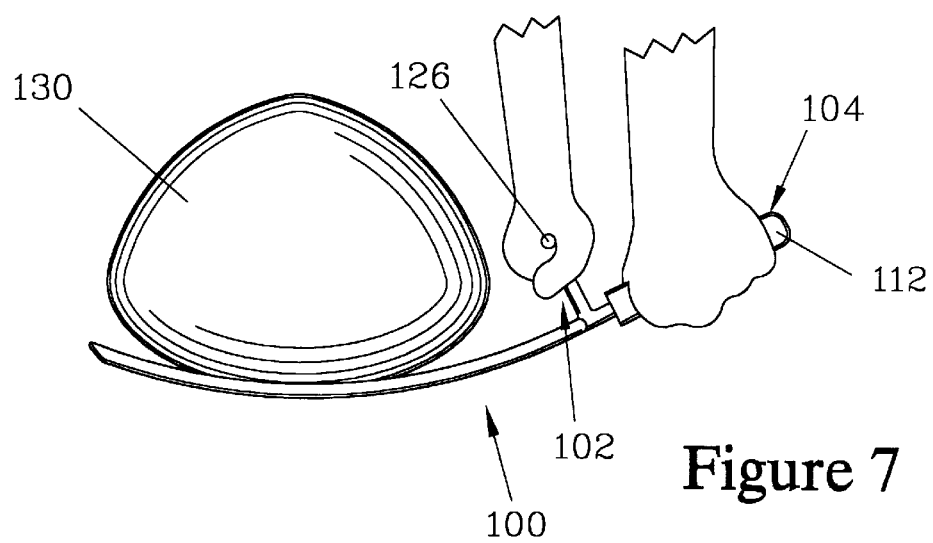
FIG. 7 is a side view of the embodiment shown in FIG. 6 where the tines are supporting a roast, showing how the auxiliary handle allows support by both hands of the user.

FIG. 7 shows the lifting tool 100 supporting a roast 130. The lifting tool 100 is inserted under the roast 130 in a manner similar to that shown for the lifting tool 10 in FIGS. 2 through 4. To lift the roast, the user grasps the main handle grip 112 of the main handle 104 with one hand, and the gripping region 126 of the auxiliary handle 102 with the other hand. This allows for using both hands to lift the roast 130. Additionally, the auxiliary handle 102 allows the user to lift the roast 130 with a lever-like action on the main handle 104, which reduces strain on the wrists. When the auxiliary handle 102 is provided, the handle 104 may be increased in length to increase the leverage available.

While an auxiliary handle such as the auxiliary handle 102 shown in FIGS. 6 and 7 facilitates lifting heavy roasts, there is a possibility of the roast contacting the hand which grasps the gripping region 126 of the auxiliary handle 102, which may result in the hand becoming burned or soiled.

Figure 8:
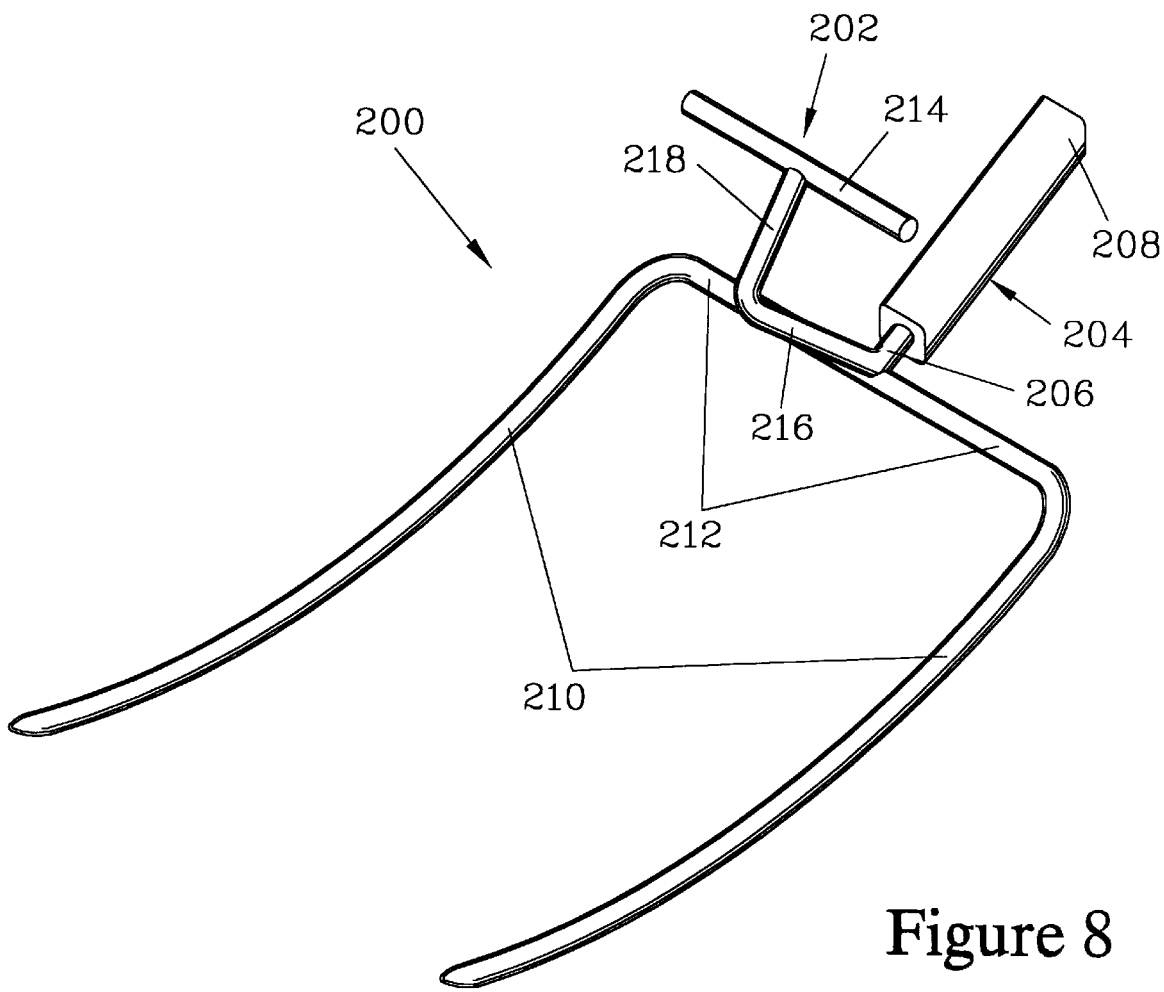
FIG. 8 is an isometric view of another embodiment of the present invention which differs from the embodiment illustrated in FIGS. 6 and 7 in the configuration of the auxiliary handle. The auxiliary handle of this embodiment is set back to protect the hand of the user from contact with a roast being lifted.

FIG. 8 is an isometric view of a lifting tool 200 which has an auxiliary handle 202 which provides greater protection for the hand of the user. Again, the lifting tool 200 has a main handle 204, having a first handle end 206 and a second handle end 208, and also has a pair of tines 210 which are connected to the first handle end 206 by a pair of cross members 212.

The auxiliary handle 202 of the lifting tool 200 has a gripping region 214. The auxiliary handle 202 also has an auxiliary handle base section 216, which is affixed with respect to the pair of cross members 212 and extends upwards from the pair of cross members 212. The auxiliary handle 202 also has an auxiliary handle set-back section 218, which connects between the auxiliary handle base section 216 and the gripping region 214. The auxiliary handle set-back section 218 extends towards the second handle end 208, which offsets the gripping region 214 with respect to the auxiliary handle base section 216 and positions the gripping region 214 over the main handle 204.

Figure 9:
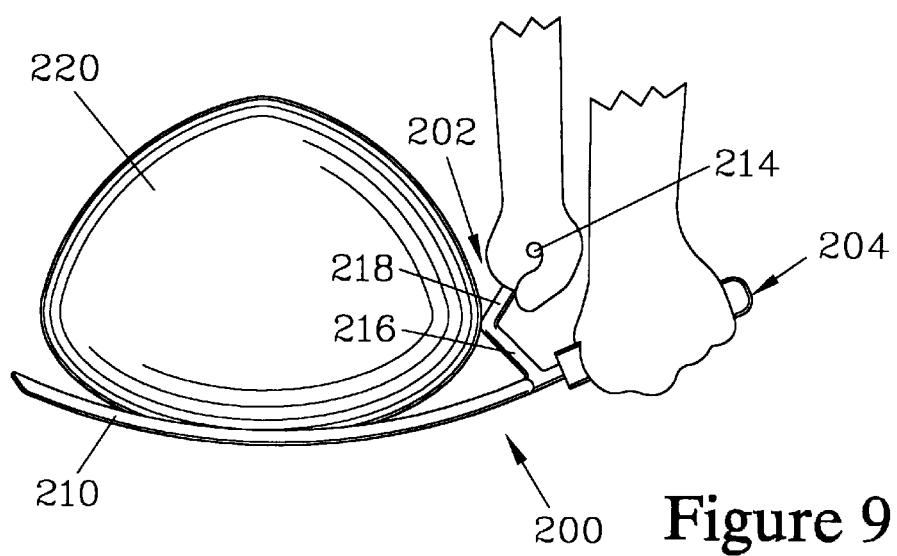
FIG. 9 is a side view of the embodiment shown in FIG. 8 where the tines are supporting a roast, showing how the configuration of the auxiliary handle prevents contact between the roast and the hand of the user.

As better shown in FIG. 9, the configuration of the auxiliary handle 202 provides increased protection from burns or soiling for the hand of the user when grasping the gripping region 214 of the auxiliary handle 202. Should the lifting tool 200 be inclined such that a roast 220 supported on the tines 210 slips towards the hands of the user, the roast 220 is stopped by engagement with the auxiliary handle base section 216 of the auxiliary handle 202. When the roast 220 is at this position, as illustrated, the auxiliary handle set-back section 218 provides the gripping region 214 a sufficient offset from the auxiliary handle base section 216 to prevent contact between the roast 220 and the hand of the user.

Figure 10:
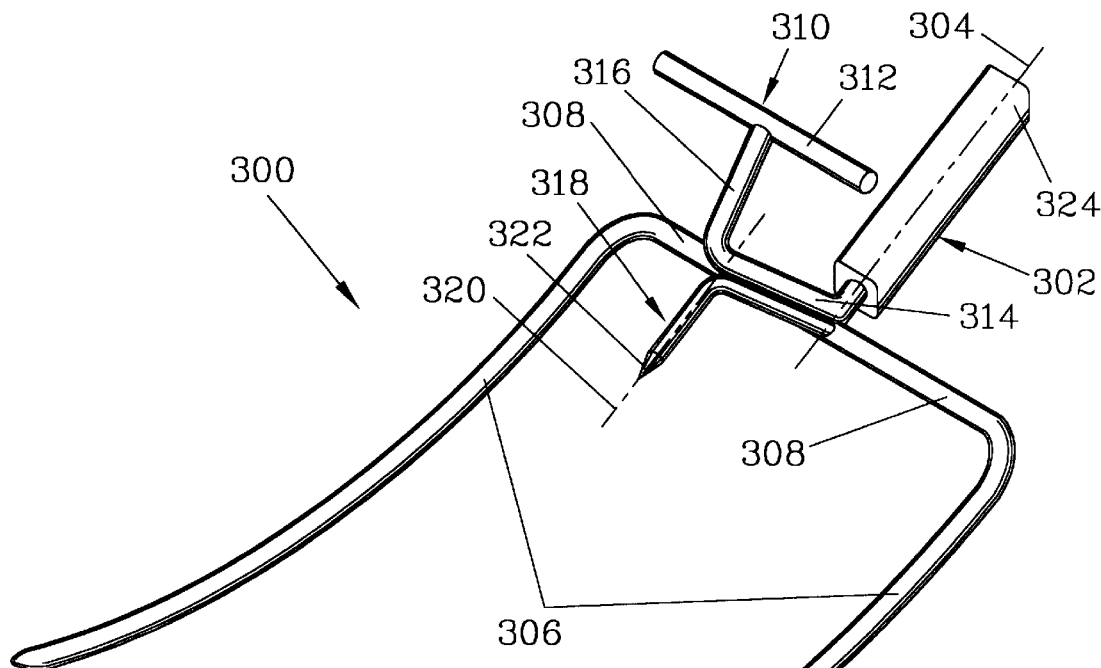
FIG. 10 is an isometric view of yet another embodiment of the present invention which is provided with a stabilizing prong to provide greater stability for a roast being lifted.

FIG. 10 is an isometric view of a lifting tool 300 which is similar to the lifting tool 200 shown in FIGS. 8 and 9, and again has a main handle 302 having a handle axis 304, a pair of tines 306, a pair of cross members 308, and an auxiliary handle 310. The auxiliary handle 310 again has a gripping region 312, an auxiliary handle base section 314 and an auxiliary handle set-back section 316.

This embodiment differs from the embodiments discussed above in that it is provided with a stabilizing prong 318. The stabilizing prong 318 has a longitudinal prong axis 320 which is substantially parallel to the handle axis 304, and has a prong tip 322 which is pointed. The stabilizing prong 318 is affixed with respect to the auxiliary handle 310 and extends away from a second handle end 324 of the main handle 302. The stabilizing prong 318 of the lifting tool 300 is connected to the auxiliary handle base section 314 of the auxiliary handle 310.

The prong tip 322 of the stabilizing prong 318 engages a roast (not shown) to provide greater stability to the roast when it is lifted by the lifting tool 300. When the lifting tool 300 is inclined such that the roast slips along the tines 306 towards the hands of the user, the roast engages the prong tip 322 of the stabilizing prong 318 and becomes impaled thereupon. The engagement of the roast with the prong tip 322 provides stability by preventing the roast from sliding in a direction normal to the handle axis 304.

While a single stabilizing prong such as the stabilizing prong 318 of the embodiment shown in FIG. 10 is useful for stabilizing many roasts, it may be ineffective for use with roast poultry, such as roasted turkeys and geese, which have a hollow central cavity therein. If the single prong engages such a cavity, it will provide little stability for the roast. To provide increased stability for roast poultry, it is preferred for two stabilizing prongs to be employed.

Figure 11:
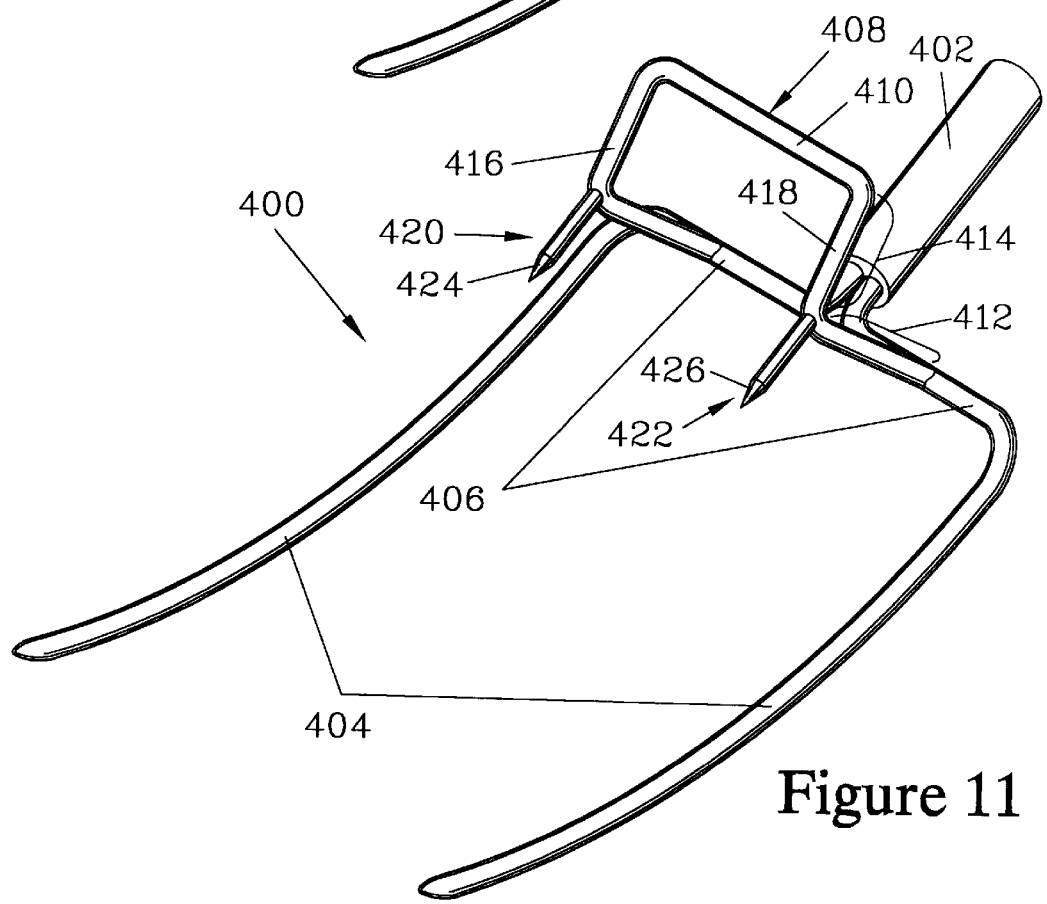
FIG. 11 is an isometric view of yet another embodiment of the present invention, which has an auxiliary handle with both a first stabilizing prong and a second stabilizing prong, making it well suited for use lifting roasted turkeys or other poultry.

FIG. 11 is an isometric view of a lifting tool 400 which is particularly well suited for use with roast poultry. The lifting tool 400 has a main handle 402, a pair of tines 404, a pair of cross members 406, and an auxiliary handle 408. The auxiliary handle 408 again has a gripping region 410, an auxiliary handle base section 412, and an auxiliary handle set-back section 414.

The auxiliary handle base section 412 and the auxiliary handle set-back section 414 of this embodiment are provided by a first upright 416 and a second upright 418 in combination. The first upright 416 connects the gripping region 410 to one of cross members 406, while the second upright 418 connects the gripping region 410 to the other cross member 406.

The lifting tool 400 is provided with both a first stabilizing prong 420 and a second stabilizing prong 422. The first stabilizing prong 420 has a first prong tip 424, which is pointed, and is affixed with respect to the auxiliary handle 408. The first stabilizing prong 420 of the lifting tool 400 is attached to the first upright 416 of the auxiliary handle 408.

The second stabilizing prong 422 is affixed with respect to the auxiliary handle 408 so as to extend substantially parallel to the first stabilizing prong 420 in a spaced apart relationship therewith. The second stabilizing prong 422 has a second prong tip 426 which is pointed, and is attached to the second upright 418 of the auxiliary handle 408.

Whether or not first and second stabilizing prongs are provided, it has been found that certain preferred dimensions make the lifting tool of the present invention well suited for lifting roasted turkeys. For such uses, it is preferred for the tines to be at least about 10 inches in length, to span the turkey to provide adequate support. It is preferred for the tines to be spaced apart from each other about 7–8 inches. This spacing has been found large enough to provide adequate stability for maneuvering turkeys, while small enough to allow lifting turkeys in the size range of about 15 to 20 pounds from one end without the turkey slipping between the tines. For smaller turkeys, the lifting tool may be inserted under the turkey from the side. To facilitate inserting the tines under the turkey, and to provide a cradle for the turkey, it is preferred for the radius of curvature of the tines to be about 15 inches. It should be noted that the radius of curvature may vary slightly over the length of the tines, generally being greater at the tine base ends.

The following examples illustrate embodiments of the present invention which were found to be well suited for lifting and supporting turkeys.

EXAMPLES

Example 1 was a lifting tool similar to the lifting tool 10 shown in FIGS. 1 through 5, formed of ⁵⁄₁₆ inch diameter metal rod and having the following dimensions:

| | |
|---|---|
| Main handle length: | 5 inches |
| Tine length: | 13¾ inches |
| Radius of curvature of tines: | 15 inches (approximate) |
| Cross member length: | 4 inches |
| Separation of tines: | 8 inches |

These dimensions resulted in a lifting tool which was found to be effective for supporting and stabilizing a turkey.

Example 2 had an auxiliary handle similar to that of the turkey lifting tool 400 shown in FIG. 11, but with a vertical auxiliary handle base section and without stabilizing prongs. Example 2 had the following dimensions:

| | |
|---|---|
| Main handle length: | 7¾ inches |
| Tine length: | 13 inches |
| Cross member length: | 3¼ inches |
| Separation of tines: | 7¼ inches |
| Gripping region length: | 5¼ inches |
| Auxiliary handle base section length: | 1¾ inches |
| Auxiliary handle set-back section length: | 2¼ inches |
| Inclination from vertical: | 45° |
| Offset of gripping region: | 1¾ inches |

These dimensions were found sufficient to prevent a 20 pound turkey from contacting the hands of the user when the turkey lifting tool was inclined to cause the turkey to slide along the tines towards the gripping region of the auxiliary handle.

Example 3 was similar to the lifting tool 400 shown in FIG. 11. ⁵⁄₁₆ inch diameter metal rod was employed for the tines, cross members, and auxiliary handle, while ¼ inch diameter rod was employed for the stabilizing prongs. Example 3 had the following dimensions:

| | |
|---|---|
| Main handle length: | 8¾ inches |
| Tine length: | 12¾ inches |
| Cross member length: | 3¾ inches |
| Separation of tines: | 8 inches |
| Gripping region length: | 4¼ inches |
| Auxiliary handle base section length: | 1½ inches |
| Inclination from vertical: | 15° towards tine tips |
| Auxiliary handle set-back section length: | 3 inches |
| Inclination from vertical: | 35° towards main handle |
| Offset of gripping region: | 1¼ inches from cross members |
| Stabilizing prong length: | 1½ inches |

These dimensions were found sufficient to lift and support a 15 pound turkey with improved stability, while avoiding contact between the turkey and the hands of the user.

While the novel features of the present invention have been described in terms of particular embodiments and preferred applications, it should be appreciated by one skilled in the art that substitution of materials and modification of details obviously can be made without departing from the spirit of the invention.

What we claim is:

1. A lifting tool for lifting and supporting roasted meat, the lifting tool comprising:

a main handle having a longitudinal handle axis, a first handle end, and a second handle end,
said main handle serving as a grip which extends along said handle axis;

a pair of tines in a spaced apart relationship, each tine of said pair of tines having a tine base end and a tine tip end, each of said tines having a substantially continuous curve which is concave when viewed from said second handle end and which is such that said tines are substantially tangent at said tine base ends to a plane in which said handle axis resides, said tines extending substantially parallel to said handle axis; and a pair of cross members, each of said cross members connecting said first handle end with said tine base end of one of said tines,
said pair of tines being spaced apart sufficiently to form a cradle for supporting the roasted meat.

2. The lifting tool of claim 1 wherein each said tine of said pair of tines has a lower surface and further comprises:
a sloped surface extending from said lower surface of said tine to said tine tip end.

3. The lifting tool of claim 2 wherein each of said tine tip ends is rounded.

4. The lifting tool of claim 1 wherein the lifting tool is constructed by bending a single piece of metal rod.

5. The lifting tool of claim 4 wherein said metal rod is constructed of stock at least about ¼ inch in diameter.

6. The lifting tool of claim 5 wherein said lifting tool has particular utility for lifting large poultry, wherein said handle is at least about 5 inches in length, and said tines are at least about 10 inches in length and are spaced apart about 7–8 inches.

7. The lifting tool of claim 6 wherein the radius of curvature of said tines is about 15 inches.

8. The lifting tool of claim 1 wherein said main handle further comprises:

a main handle grip of an insulating material;

a tang embedded in said main handle grip, said tang being joined with said pair of cross members and extending substantially parallel to said handle axis.

9. A lifting tool for lifting and supporting roasted meat, the lifting tool comprising:

a main handle having a longitudinal handle axis, a first handle end, and a second handle end,
said main handle serving as a grip which extends along said handle axis;

a pair of tines in a spaced apart relationship, each tine of said pair of tines having a tine base end and a tine tip end, each of said tines having a substantially continuous curve which is concave when viewed from said second handle end,
said tines extending substantially parallel to said handle axis,
said grip provided by said main handle being substantially centered with respect to said tines and extending in a direction substantially opposite that in which said tines extend;

a pair of cross members, each of said cross members connecting said first handle end with said tine base end of one of said tines,
whereby said pair of tines are spaced apart sufficiently to form a cradle for supporting the roasted meat; and an auxiliary handle having a gripping region, said auxiliary handle being affixed with respect to said pair of cross members such that said substantially continuous curve of each of said tines is concave when viewed from said gripping region.

10. The lifting tool of claim 9 wherein said auxiliary handle further comprises:

a first upright connecting between one of said pair of cross members and said gripping region; and a second upright connecting between the other of said pair of cross members and said gripping region.

11. The lifting tool of claim 10 wherein said first upright and said second upright of said auxiliary handle further comprise:

an auxiliary handle base section of said first upright and said second upright, said auxiliary handle base section being affixed with respect to said pair of cross members and extending upwards therefrom; and an auxiliary handle set-back section of said first upright and said second upright, said auxiliary handle set-back section connecting between said auxiliary handle base section and said gripping region, said auxiliary handle set-back section extending towards said second handle end so as to offset said gripping region with respect to said auxiliary handle base section such that said gripping region resides over said main handle.

12. A lifting tool for lifting and supporting roasted meat, the lifting tool comprising:

a main handle having a longitudinal handle axis, a first handle end, and a second handle end;

a pair of tines in a spaced apart relationship, each tine of said pair of tines having a tine base end and a tine tip end, each of said tines having a substantially continuous curve which is concave when viewed from said second handle end;

a pair of cross members, each of said cross members connecting said first handle end with said tine base end of one of said tines; and an auxiliary handle having,
a gripping region,
said auxiliary handle being affixed with respect to said pair of cross members such that said substantially continuous curve of each of said tines is concave when viewed from said gripping region,
an auxiliary handle base section which is affixed with respect to said pair of cross members and extends upwards therefrom, and
an auxiliary handle set-back section connecting between said auxiliary handle base section and said gripping region, said auxiliary handle set-back section extending towards said second handle end so as to offset said gripping region with respect to said auxiliary handle base section such that said gripping region resides over said main handle.

13. The lifting tool of claim 12 further comprising:

a first stabilizing prong having a longitudinal prong axis which is substantially parallel to said handle axis and a first prong tip which is pointed, said first stabilizing prong being affixed with respect to said auxiliary handle and extending away from said second handle end.

14. The lifting tool of claim 13 further comprising:

a second stabilizing prong having a second prong tip which is pointed, said second stabilizing prong being affixed with respect to said auxiliary handle so as to extend substantially parallel to said first stabilizing prong in a spaced apart relationship thereto.

15. The lifting tool of claim 14 wherein said auxiliary handle further comprises:

a first upright connecting between one of said pair of cross members and said gripping region; and a second upright connecting between the other of said pair of cross members and said gripping region, said first upright and said second upright, in combination, providing said auxiliary handle base section and said auxiliary handle set-back section.

16. The lifting tool of claim 15 wherein said first stabilizing prong is attached to said first upright and said second stabilizing prong is attached to said second upright.

17. The lifting tool of claim 2 wherein said auxiliary handle further comprises:

a first upright connecting between one of said pair of cross members and said gripping region; and a second upright connecting between the other of said pair of cross members and said gripping region, said first upright and said second upright providing said auxiliary handle base section and said auxiliary handle set-back section.

\* \* \* \* \*